United States Patent
Nordback (10) Patent No.: US 8,432,572 B2
(45) Date of Patent: Apr. 30, 2013

(54) SYSTEMS AND METHODS OF TRAPPING FOR PRINT DEVICES

(75) Inventor: Kurt Nathan Nordback, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 709 days.

(21) Appl. No.: 11/771,973

(22) Filed: Jun. 29, 2007

(65) Prior Publication Data
US 2009/0002765 A1   Jan. 1, 2009

(51) Int. Cl.
G06K 15/00 (2006.01)
G06T 5/00 (2006.01)
H04N 1/407 (2006.01)
H04N 1/409 (2006.01)

(52) U.S. Cl.
USPC ......... 358/1.16; 358/1.9; 358/3.26; 358/3.27; 382/254; 382/256; 382/266

(58) Field of Classification Search .......... 358/1.9, 358/3.26–3.27, 532–533; 382/254–275, 382/176
See application file for complete search history.

(56) References Cited

U.S. PATENT DOCUMENTS

| | | | |
|---|---|---|---|
| 5,313,570 A * | 5/1994 | Dermer et al. | 345/589 |
| 5,315,691 A * | 5/1994 | Sumiya et al. | 358/1.9 |
| 5,555,094 A * | 9/1996 | Lefebvre et al. | 382/283 |
| 5,687,303 A * | 11/1997 | Motamed et al. | 358/1.18 |
| 6,169,607 B1 | 1/2001 | Harrington | |
| 6,178,007 B1 | 1/2001 | Harrington | |
| 6,179,485 B1 | 1/2001 | Harrington | |
| 6,195,674 B1 | 2/2001 | Elbourne et al. | |
| 6,201,551 B1 | 3/2001 | Loce et al. | |
| 6,222,648 B1 | 4/2001 | Wolf et al. | |
| 6,236,754 B1 * | 5/2001 | Harrington | 382/199 |
| 6,237,079 B1 | 5/2001 | Stoney | |
| 6,246,396 B1 | 6/2001 | Gibson et al. | |
| 6,246,419 B1 | 6/2001 | Loce et al. | |
| 6,252,677 B1 * | 6/2001 | Hawes et al. | 358/1.9 |

(Continued)

FOREIGN PATENT DOCUMENTS

| | | |
|---|---|---|
| EP | 0 924 651 A2 | 6/1999 |
| JP | 07-306938 A | 11/1995 |
| JP | 09-052392 A | 2/1997 |
| JP | 2003-51939 A | 2/2003 |

OTHER PUBLICATIONS

U.S. Appl. No. 12/060,235, filed Mar. 31, 2008.

(Continued)

*Primary Examiner* — Richard Zhu
(74) *Attorney, Agent, or Firm* — Finnegan, Henderson, Farabow, Garrett & Dunner, L.L.P.

(57) ABSTRACT

Systems and methods are provided for identifying candidates for trapping in a frame buffer by correlating display list object information stored in an object-ID plane with pixel data in the frame buffer. In some embodiments, the display list of objects may be generated from the PDL description of a document. In some embodiments, object boundaries may be computed by assigning unique identifiers to objects in the object-ID plane and using morphological techniques to identify object boundaries. Object boundary information may then be utilized to perform trapping on pixels in the frame buffer. The methods described may be performed on a computer and/or a printing device and implemented using one or more of combination of hardware, software, and/or firmware.

16 Claims, 4 Drawing Sheets

U.S. PATENT DOCUMENTS

| | | | |
|---|---|---|---|
| 6,259,456 B1 | 7/2001 | Gibson et al. | |
| 6,269,184 B1 | 7/2001 | Spaulding et al. | |
| 6,272,257 B1 | 8/2001 | Prokop | |
| 6,275,607 B1 | 8/2001 | Shimizu et al. | |
| 6,289,138 B1 | 9/2001 | Yip et al. | |
| 6,302,522 B1 | 10/2001 | Rumph et al. | |
| 6,311,258 B1 | 10/2001 | Gibson et al. | |
| 6,313,842 B1 | 11/2001 | Tampieri | |
| 6,324,305 B1 * | 11/2001 | Holladay et al. | 382/239 |
| 6,336,180 B1 | 1/2002 | Long et al. | |
| 6,349,379 B2 | 2/2002 | Gibson et al. | |
| 6,360,007 B1 | 3/2002 | Robinson et al. | |
| 6,369,909 B1 | 4/2002 | Shima | |
| 6,393,545 B1 | 5/2002 | Long et al. | |
| 6,414,687 B1 | 7/2002 | Gibson | |
| 6,421,140 B1 | 7/2002 | Hui | |
| 6,490,696 B1 * | 12/2002 | Wood et al. | 714/38 |
| 6,507,898 B1 | 1/2003 | Gibson et al. | |
| 6,515,763 B1 * | 2/2003 | Dermer et al. | 358/1.9 |
| 6,633,297 B2 | 10/2003 | McCormack et al. | |
| 6,642,931 B1 | 11/2003 | Haikin et al. | |
| 6,674,536 B2 | 1/2004 | Long et al. | |
| 6,707,463 B1 | 3/2004 | Gibson et al. | |
| 6,727,999 B1 | 4/2004 | Takahashi | |
| 6,774,953 B2 | 8/2004 | Champion et al. | |
| 6,781,720 B1 * | 8/2004 | Klassen | 358/3.27 |
| 6,791,711 B1 | 9/2004 | Uekusa et al. | |
| 6,792,485 B2 | 9/2004 | Aoki et al. | |
| 6,819,782 B1 | 11/2004 | Imagawa et al. | |
| 6,839,150 B1 | 1/2005 | Sugiura et al. | |
| 6,839,461 B2 | 1/2005 | Tomomatsu | |
| 6,862,110 B2 | 3/2005 | Harrington | |
| 6,870,636 B2 | 3/2005 | Kulkarni | |
| 6,873,432 B1 | 3/2005 | Thieret | |
| 6,876,825 B2 | 4/2005 | Kurahashi et al. | |
| 6,886,912 B2 | 5/2005 | Mantell | |
| 6,891,970 B1 | 5/2005 | Suzuki | |
| 6,906,834 B1 | 6/2005 | Kagawa et al. | |
| 6,912,059 B1 | 6/2005 | Takahashi | |
| 6,930,788 B1 | 8/2005 | Iwamoto et al. | |
| 6,930,809 B1 | 8/2005 | Kagawa et al. | |
| 6,954,288 B2 | 10/2005 | Uekusa et al. | |
| 6,972,857 B2 | 12/2005 | Mantell et al. | |
| 6,985,245 B1 | 1/2006 | Takahashi | |
| 6,990,039 B2 | 1/2006 | Hirai | |
| 6,995,864 B1 | 2/2006 | Sugiura et al. | |
| 7,012,639 B1 | 3/2006 | Ishikawa et al. | |
| 7,016,061 B1 | 3/2006 | Hewitt | |
| 7,072,052 B1 | 7/2006 | Tanahashi et al. | |
| 7,079,276 B2 | 7/2006 | Kimura | |
| 7,084,994 B1 | 8/2006 | Koppich et al. | |
| 7,092,654 B2 | 8/2006 | Kurahashi et al. | |
| 7,116,821 B2 * | 10/2006 | Lane et al. | 382/178 |
| 7,119,920 B2 | 10/2006 | Takahashi | |
| 7,119,927 B2 | 10/2006 | Sugiura et al. | |
| 7,123,381 B2 * | 10/2006 | Klassen | 358/1.9 |
| 7,136,523 B2 | 11/2006 | Fukao et al. | |
| 7,142,318 B2 | 11/2006 | Lopez et al. | |
| 7,142,710 B2 | 11/2006 | Hung | |
| 7,171,442 B1 | 1/2007 | Huang | |
| 7,190,827 B2 | 3/2007 | Zeng et al. | |
| 7,263,218 B2 | 8/2007 | Altenhof-Long et al. | |
| 7,274,487 B2 | 9/2007 | Fukasawa | |
| 7,283,266 B2 | 10/2007 | Yagita | |
| 7,292,949 B2 | 11/2007 | Ding | |
| 7,296,791 B2 | 11/2007 | Kurahashi et al. | |
| 7,321,450 B2 | 1/2008 | Uekusa et al. | |
| 7,359,530 B2 * | 4/2008 | Wilson | 382/103 |
| 7,359,576 B1 * | 4/2008 | Worthington et al. | 382/279 |
| 7,423,781 B2 * | 9/2008 | Morimoto et al. | 358/2.1 |
| 7,538,896 B2 | 5/2009 | Tanaka | |
| 7,598,964 B2 | 10/2009 | Olson | |
| 7,804,630 B2 | 9/2010 | Nishikawa | |
| 7,830,540 B2 | 11/2010 | Matsuda | |
| 7,903,286 B2 | 3/2011 | Nordback | |
| 2001/0021971 A1 | 9/2001 | Gibson et al. | |
| 2002/0051193 A1 | 5/2002 | Oki | |
| 2002/0057446 A1 | 5/2002 | Long et al. | |
| 2002/0063911 A1 | 5/2002 | Hui | |
| 2002/0069236 A1 | 6/2002 | Jahnke | |
| 2002/0075493 A1 | 6/2002 | Harrington | |
| 2002/0075501 A1 | 6/2002 | Mantell et al. | |
| 2002/0085224 A1 | 7/2002 | Price et al. | |
| 2003/0016305 A1 | 1/2003 | Champion et al. | |
| 2003/0034986 A1 | 2/2003 | Fukasawa | |
| 2003/0098986 A1 | 5/2003 | Pop | |
| 2003/0138142 A1 | 7/2003 | Hung | |
| 2003/0142330 A1 | 7/2003 | Arakawa | |
| 2003/0147088 A1 | 8/2003 | Kulkarni | |
| 2003/0164971 A1 | 9/2003 | Kidani et al. | |
| 2004/0017585 A1 | 1/2004 | Makishima et al. | |
| 2004/0021882 A1 | 2/2004 | Kakutani | |
| 2004/0021900 A1 | 2/2004 | Arakawa | |
| 2004/0032615 A1 | 2/2004 | Kurakata | |
| 2004/0042035 A1 | 3/2004 | Uejo | |
| 2004/0042037 A1 | 3/2004 | Uejo | |
| 2004/0042038 A1 | 3/2004 | Uejo | |
| 2004/0101195 A1 | 5/2004 | Akaishi | |
| 2004/0135845 A1 | 7/2004 | Mantell | |
| 2004/0141642 A1 | 7/2004 | Zeng et al. | |
| 2004/0151361 A1 | 8/2004 | Bedard et al. | |
| 2004/0169876 A1 | 9/2004 | Takahashi | |
| 2004/0184658 A1 | 9/2004 | Inoue | |
| 2004/0212814 A1 | 10/2004 | Ishigami | |
| 2004/0223173 A1 | 11/2004 | Arai | |
| 2004/0223174 A1 | 11/2004 | Mikami | |
| 2004/0252345 A1 | 12/2004 | Uekusa et al. | |
| 2004/0257596 A1 | 12/2004 | Mestha et al. | |
| 2005/0018228 A1 | 1/2005 | Takahashi | |
| 2005/0021970 A1 | 1/2005 | Reese et al. | |
| 2005/0027482 A1 | 2/2005 | Benaoudia et al. | |
| 2005/0117398 A1 | 6/2005 | Hirai | |
| 2005/0131907 A1 | 6/2005 | Matsuzawa et al. | |
| 2005/0135672 A1 | 6/2005 | Altenhof-Long et al. | |
| 2005/0180771 A1 | 8/2005 | Kurahashi et al. | |
| 2005/0185840 A1 | 8/2005 | Sugiura et al. | |
| 2005/0213117 A1 | 9/2005 | Clark et al. | |
| 2005/0259287 A1 | 11/2005 | Watanabe | |
| 2005/0275856 A1 | 12/2005 | Oki | |
| 2005/0289346 A1 | 12/2005 | Minagawa | |
| 2006/0001728 A1 | 1/2006 | Murakami | |
| 2006/0033956 A1 | 2/2006 | Takahashi | |
| 2006/0034630 A1 | 2/2006 | Yabe | |
| 2006/0061794 A1 | 3/2006 | Ito et al. | |
| 2006/0071938 A1 | 4/2006 | Richardson et al. | |
| 2006/0245016 A1 | 11/2006 | Fukao et al. | |
| 2006/0262339 A1 | 11/2006 | Jacobs et al. | |
| 2006/0274341 A1 | 12/2006 | Kumada et al. | |
| 2006/0274939 A1 | 12/2006 | Yamada | |
| 2007/0052996 A1 | 3/2007 | Ota | |
| 2007/0057961 A1 | 3/2007 | Enami et al. | |
| 2007/0086050 A1 | 4/2007 | Matsuda | |
| 2007/0121172 A1 | 5/2007 | Hamada | |
| 2007/0195353 A1 * | 8/2007 | Tsunoda | 358/1.13 |
| 2007/0216930 A1 | 9/2007 | Jacobs et al. | |
| 2008/0005176 A1 | 1/2008 | Shimizu | |
| 2008/0024807 A1 | 1/2008 | Matsuda | |
| 2008/0030750 A1 | 2/2008 | Kato | |
| 2009/0244563 A1 | 10/2009 | Nordback | |
| 2009/0245628 A1 | 10/2009 | Nordback | |
| 2009/0310151 A1 | 12/2009 | Nordback | |
| 2011/0075164 A1 | 3/2011 | Nordback | |
| 2011/0157620 A1 | 6/2011 | Nordback | |

OTHER PUBLICATIONS

Office Action dated Jun. 2, 2011, in U.S. Appl. No. 12/060,235, filed Mar. 31, 2008 by Nordback.
Office Action dated Oct. 14, 2011, in U.S. Appl. No. 12/060,235, filed Mar. 31, 2008 by Nordback.
Office Action dated Feb. 14, 2012, in U.S. Appl. No. 12/060,235, filed Mar. 31, 2008 by Nordback.
U.S. Appl. No. 12/078,112, filed Mar. 27, 2008.
Office Action dated May 11, 2010, in U.S. Appl. No. 12/078,112, filed Mar. 27, 2008 by Nordback.
Notice of Allowance dated Nov. 1, 2010, in U.S. Appl. No. 12/078,112, filed Mar. 27, 2008 by Nordback.

U.S. Appl. No. 12/138,028, filed Jun. 12, 2008.
Office Action dated Aug. 15, 2011, in U.S. Appl. No. 12/138,028, filed Jun. 12, 2008 by Nordback.
Office Action dated Jan. 12, 2012, in U.S. Appl. No. 12/138,028, filed Jun. 12, 2008 by Nordback.
U.S. Appl. No. 12/571,131, filed Sep. 30, 2009.
U.S. Appl. No. 12/650,925, filed Dec. 31, 2009.
Notification of Refusal mailed Nov. 20, 2012, issued in related Japanese Patent Application No. 2008-166668.
Lorem Ipsum http://web.archive.org/web/20020123143646//http://lipsum.com/ (Jan. 2002).

U.S. Office Action dated Aug. 10, 2012, in U.S. Appl. No. 12/060,235, filed Mar. 31, 2008.
U.S. Office Action dated May 3, 2012, in U.S. Appl. No. 12/138,028, filed Jun. 12, 2008.
U.S. Office Action dated Sep. 25, 2012, in U.S. Appl. No. 12/138,028, filed Jun. 12, 2008.
U.S. Office Action dated Aug. 8, 2012, in U.S. Appl. No. 12/571,131, filed Jun. 12, 2008.
Office Action dated Nov. 19, 2012, in U.S. Appl. No. 12/650,925, filed Dec. 31, 2009.

* cited by examiner

SYSTEMS AND METHODS OF TRAPPING FOR PRINT DEVICES

BACKGROUND

1. Field of the Invention

The present invention relates to the field of printing and in particular, to systems and methods to implement trapping for print devices.

2. Description of Related Art

Pixels generated by a color printer typically consist of colors from multiple color planes. For example, in a color printer that uses cyan, magenta, yellow, and black ("CMYK"), a single pixel can consist of color from one or more of the four color planes. A wide range of colors may be produced by a printer when colors from constituent color planes are combined with differing intensities. The color components that make up a pixel are ideally printed on top of, or very close to one another. However, because of misregistration caused by print engine misalignment, paper stretching, and other mechanical imprecisions, the constituent color planes that make up a single pixel may not overlap adequately resulting in unsightly small white gaps between different-colored regions on the page, or in colored edges to black regions. To redress misregistration it is common to use a technique called trapping, which expands or contracts coloring regions slightly in order to eliminate white gaps and/or colored edges between graphical objects. Trapping introduces areas of color into color separations and masks the visible effects of misregistration.

Some software applications generate trapping data directly in the print job. By moving the trapping function for an entire page to a late stage in the output process, the exact colorants and resources available on the device are known when the trapping is performed.

Trapping is often implemented by (i) modifying or adding display list objects, or (ii) by directly modifying data in the frame buffer of the Raster Image Processor ("RIP"). Here, we term the first method in-RIP trapping, and the second raster-based trapping. While in-RIP trapping provides flexibility, it is complicated to implement because of the relatively large number of trapping parameters and display list objects that need to be tracked. The second method is less complex to implement. However, it is less accurate and involves the computationally expensive step of finding object boundaries using data in the frame buffer that potentially spans multiple color planes.

Thus, there is a need for systems and methods that provide trapping functionality at a low implementation and computational cost while maintaining the quality of trapped printed output.

SUMMARY

Embodiments consistent with the present invention include systems and methods for performing trapping using object information present in a printable data. The printable data may be may be a display list representation derived from a page description language description of a document. In one embodiment, the method comprises rasterizing the printable data and storing resulting rasterized data in at least one of a plurality of color planes in a frame buffer; determining object boundaries for objects using the printable data; selecting candidate objects for trapping using the computed object boundary data; and modifying pixels in the at least one color plane in the frame buffer corresponding to candidate objects selected for trapping.

Object boundaries may be determined by assigning an object-ID to objects in the printable data; storing the object-ID's in an object-ID plane in accordance with the shape of the object; and computing object boundaries using stored data in the object-ID plane. The object-ID plane may hold object-ID information for pixels in color planes in the frame buffer corresponding to the objects. Object boundaries in the object-ID plane may be computed using one or more of: computing the set-wise difference between the dilated and original objects; and/or finding non-zero values in the result obtained by convolving objects in the object-ID plane with a differencing kernel.

In some embodiments, the object-ID plane may be implemented as a two-dimensional array with the same geometry as the rasterized frame buffer. In other embodiments, object-ID information held in the object ID plane may be held in a compressed format. In one embodiment, the object-ID assigned to at least one object in the second printable data may uniquely identify the object. In another embodiment, the object-ID assigned to the at least one object may overlap with the object-IDs of non-adjacent objects.

Embodiments of the present invention also relate to software, firmware, and program instructions created, stored, accessed, or modified by processors using computer-readable media or computer-readable memory. The methods described may be performed on a computer and/or a printing device.

These and other embodiments are further explained below with respect to the following figures.

DETAILED DESCRIPTION

In accordance with embodiments reflecting various features of the present invention, systems and methods for implementing trapping using a second or intermediate form of printable data generated from a first printable data are presented. In some embodiments, the first printable data may take the form of a PDL description of a document and the intermediate printable data may take the form of a display list of objects generated from the PDL description.

Figure 1:
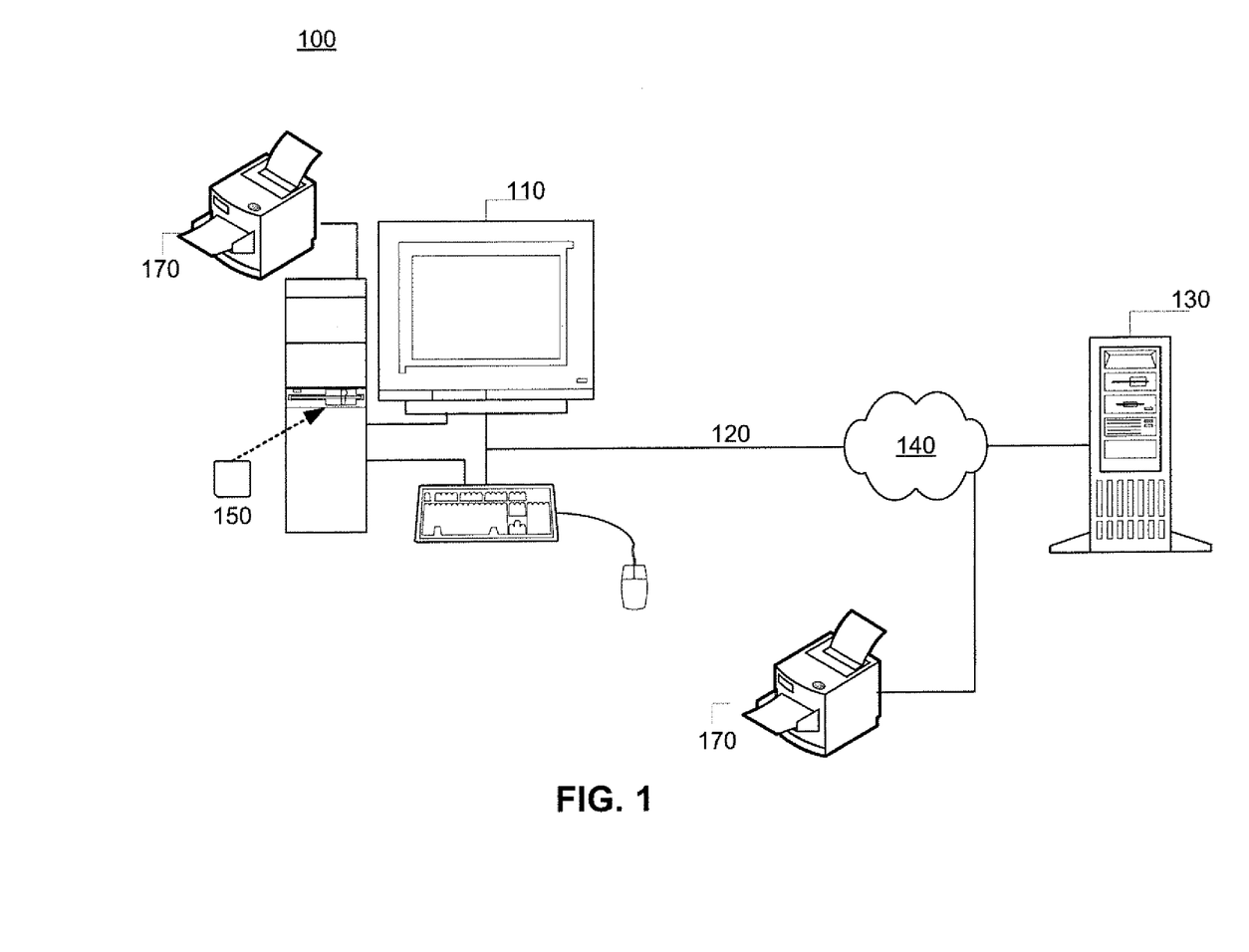
FIG. 1 shows a block diagram illustrating components in a system for printing documents according to some embodiments of the present invention.

FIG. 1 shows a block diagram illustrating components in an exemplary system for printing documents. An application for implementing trapping may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL"). PDL's may include PostScript, Adobe PDF, HP PCL, Microsoft XPS, and variants thereof. A PDL description of a document provides a high-level description of each page in a document. This PDL description is often translated to a series of lower-level printer-specific commands when the document is being printed.

The translation process from PDL to lower-level printer-specific commands may be complex and depend on the features and capabilities offered by exemplary printer 170. For example, printer 170 may process its data in stages. In a first stage, printer 170 may parse PDL commands and break down high-level instructions into a set of lower level instructions called primitives. These primitives may be fed to a subsequent stage in exemplary printer 170, which may use them to determine where to place marks on a page. In some instances, each primitive may be processed as it is generated. In other systems, a large set of primitives may be generated, stored, and then processed. For example, the primitives needed to describe a single page may be generated, stored in a list, and then processed. A set of stored primitives is termed an intermediate list or a display list.

Exemplary printer 170 includes devices that produce physical documents from electronic data including, but not limited to, laser printers, ink-jet printers, LED printers, plotters, facsimile machines, and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphics, and images, can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet®, USB, SCSI, FIREWIRE, and/or coaxial cable ports for transmission of data through the appropriate connection.

Network 140 could include a Local Area Network (LAN), a Wide Area Network (WAN), or the Internet. In some embodiments, information sent over network 140 may be encrypted to ensure the security of the data being transmitted. Printer 170 may be connected to network 140 through connection 120. Exemplary printer 170 may also be connected directly to computing device 110 and/or server 130. System 100 may also include other peripheral devices (not shown). An application to implement trapping for print devices may be deployed on one or more of the exemplary computers or printers, as shown in FIG. 1. For example, computing device 110 could execute software that may be downloaded directly from server 130, and portions of the application may also be executed by exemplary printer 170.

Figure 2:
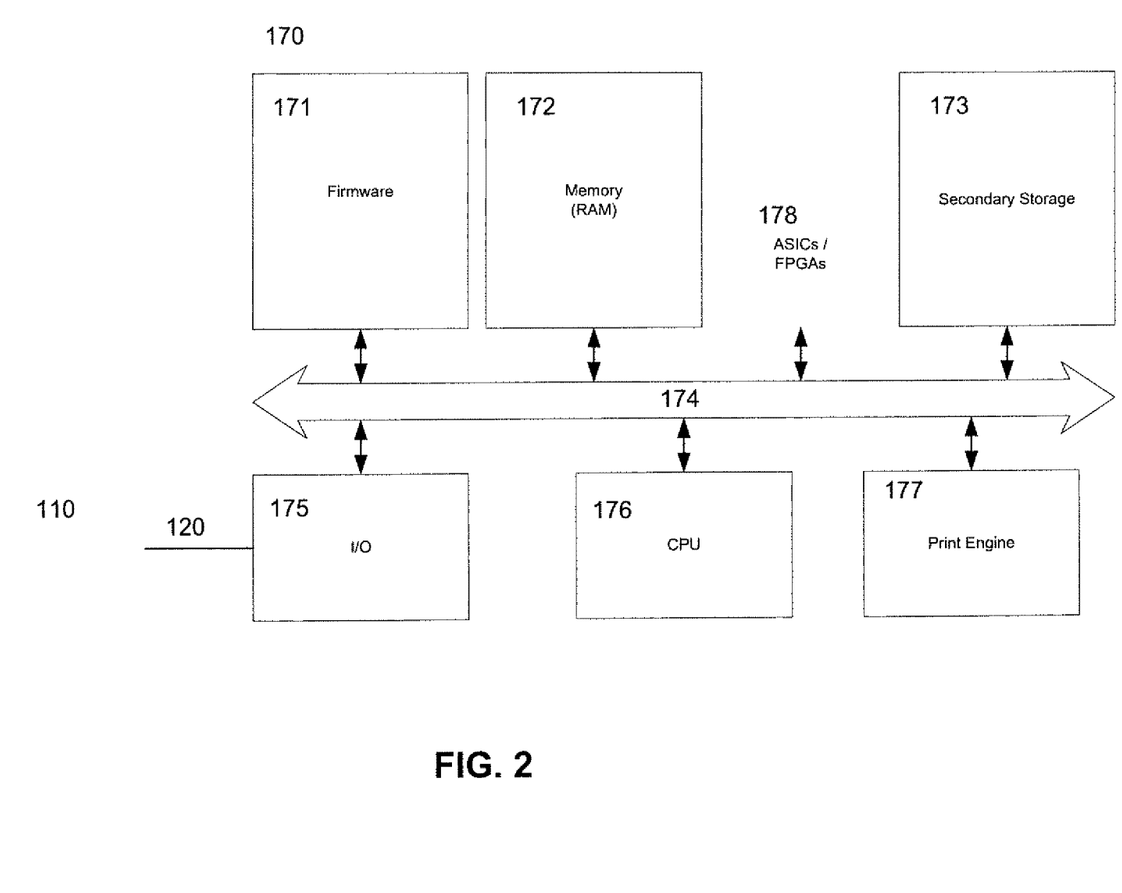
FIG. 2 shows a high level block diagram of an exemplary printer.

FIG. 2 shows a high-level block diagram of exemplary printer 170. Exemplary printer 170 may contain bus 174 that couples CPU 176, firmware 171, memory 172, input-output ports 175, print engine 177, and secondary storage device 173. Exemplary Printer 170 may also contain other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. In some embodiments, printer 170 may also be capable of executing software including a printer operating system and other appropriate application software. Exemplary printer 170 may allow paper sizes, output trays, color selections, and print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as but not limited to SDRAM, or RDRAM. Firmware 171 may hold instructions and data including but not limited to a boot-up sequence, pre-defined routines including routines for image processing, trapping, document processing, and other code. In some embodiments, code and data in firmware 171 may be copied to memory 172 prior to being acted upon by CPU 176. Routines in firmware 171 may include code to translate page descriptions received from computing device 110 to display lists. In some embodiments, firmware 171 may include rasterization routines to convert display commands in a display list to an appropriate rasterized bit map and store the bit map in memory 172. Firmware 171 may also include compression, trapping, and memory management routines. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. FPGAs/ASICs 178 may also implement one or more of translation, trapping, compression, and rasterization algorithms.

Exemplary computing device 110 may transform document data into a first printable data. In some embodiments, the first printable data may correspond to a PDL description of a document. Then, the first printable data can be sent to printer 170 for transformation into intermediate printable data. In some embodiments, the translation process from a PDL description of a document to the final printable data comprising of a series of lower-level printer-specific commands may include the generation of intermediate printable data comprising of display lists of objects. Display lists may hold one or more of text, graphics, and image data objects and one or more types of data objects in a display list may correspond to an object in a user document. Display lists, which may aid in the generation of intermediate printable data, may be stored in memory 172 or secondary storage 173. Exemplary secondary storage 173 may be an internal or external hard disk, memory stick, or any other memory storage device capable of being used by system 200. In some embodiments, the display list may reside and be transferred between one or more of printer 170, computing device 110, and server 130 depending on where the document processing occurs. Memory to store display lists may be a dedicated memory or form part of general purpose memory, or some combination thereof. In some embodiments, memory to hold display lists may be dynamically allocated, managed, and released as needed. Printer 170 may transform intermediate printable data into a final form of printable data and print according to this final form.

Figure 3:
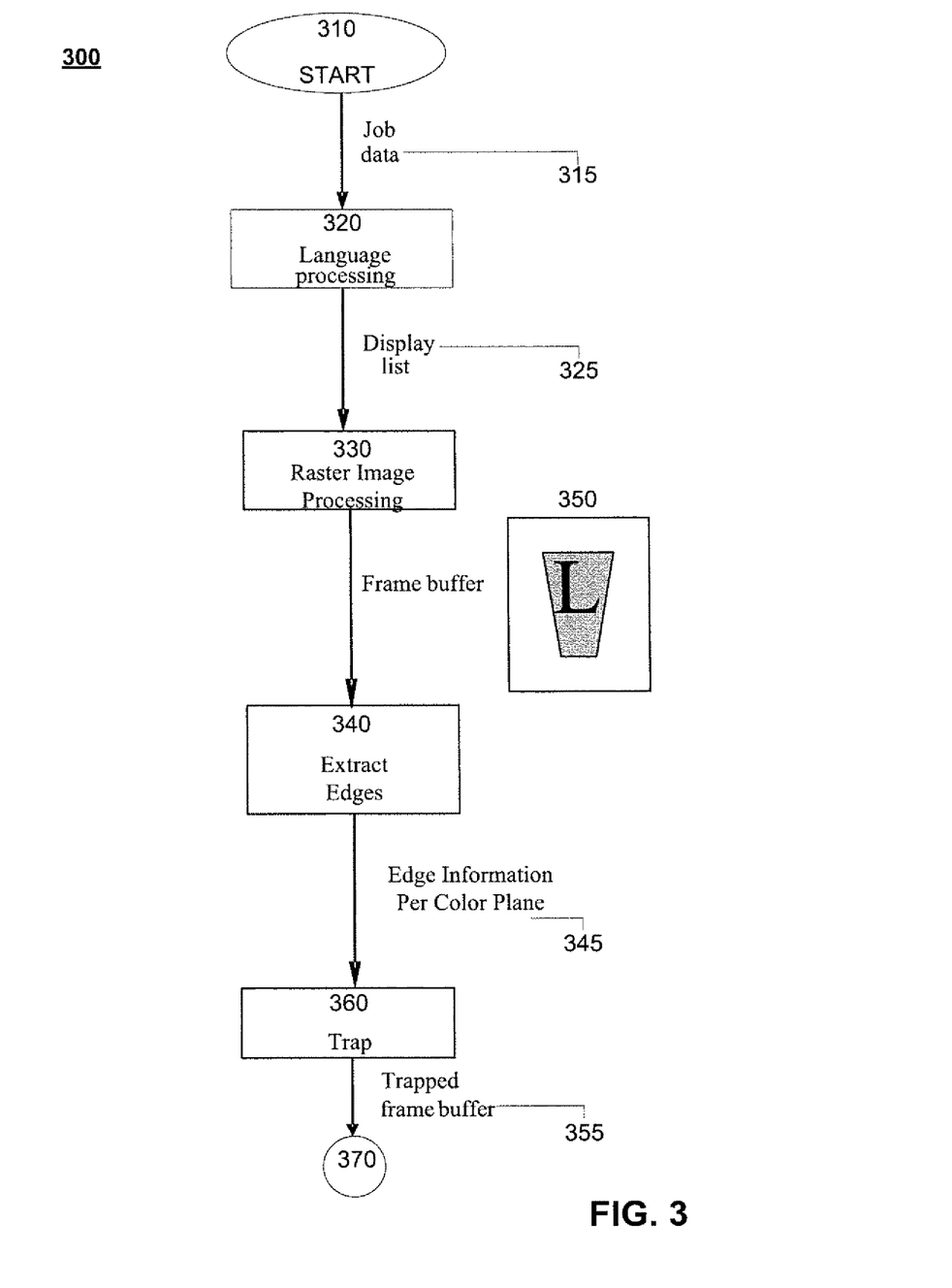
FIG. 3 shows an exemplary flowchart illustrating steps in a conventional method for performing trapping on data in the frame buffer utilized by a raster image processor.

FIG. 3 shows exemplary flowchart 300 illustrating steps in a conventional method for performing trapping on data in the frame buffer utilized by a raster image processor. The process may start in step 300 with the initiation of a print job. In step 310, print job data 315 can be subjected to language processing. In some embodiments, language processing may be performed by a language server. For example, a language server may take PDL language-level objects and transform the language level objects into data, image, text, and graphical objects and add these to display list 325. Exemplary display list 325 may be an intermediate step in the processing of data prior to actual printing and may be parsed before conversion into a subsequent form. The conversion process from a display list representation to a form suitable for printing on physical media may be referred to as rasterizing the data or rasterization. Each point of this image contains such information as color and depth. For example, basic rasterization may be accomplished by taking a 3-dimensional scene, typically described using polygons, and rendering the 3-dimensional scene onto a 2-dimensional surface. Polygons can be represented as collections of triangles. A triangle may be represented by 3 vertices in the 3-dimensional space. A vertex defines a point, an endpoint of an edge, or a corner of a polygon where two edges meet. Thus, basic rasterization may transform a stream of vertices into corresponding 2-dimensional points and fill in the transformed 2-dimensional triangles. Upon rasterization, the rasterized data may be stored in a frame buffer, such as exemplary frame buffer 350, which may be physically located in memory 172. Print engine 177, may process the rasterized data in frame buffer 350, and form a printable image of the page on a print medium, such as paper.

In step 330, the RIP may process data objects in display list 325 and generate a rasterized equivalent in frame buffer 350. In some embodiments, raster image processing may be performed by printer 170. For example, raster image processing may be performed by printer 170 using one or more of CPU 176, ASICs/FPGAs 178, memory 172, and/or secondary storage 173. Raster image processing may be performed by printer 170 using some combination of software, firmware, and/or specialized hardware such as ASICs/FPGAs 178. Frame buffer 350 may hold a representation of print objects in a form suitable for printing on a print medium by print engine 177.

In conventional methods of performing trapping, edge information may be extracted from data in frame buffer 350, in step 340. Conventional edge detection may be performed by several well-known algorithms and their variants thereof including Infinite Symmetric Exponential Filter (ISEF), Canny edge-detection (due to John F. Canny), Marr-Hildreth (due to D. Marr and E. C. Hildreth), Sobel (due to I. Sobel), Kirch, and Laplacian. Data in frame buffer 350 typically includes data for multiple color planes. For example, in a CMYK printer data in frame buffer 350 may include data from the cyan, magenta, yellow, and black color planes. The presence of multiple color planes introduces additional complexity into the conventional edge detection process. Accordingly, conventional edge detection algorithms may need to perform additional computations increasing the computational cost of the procedure. By nature, conventional edge detection algorithms are approximations on account of the fact that they rely on assumptions about the data being operated upon in order to find edges. Accordingly, such algorithms may occasionally detect false edges, or fail to detect edges. In addition, because object specific information is not present in the frame buffer, conventional edge detection algorithms cannot distinguish between edges within objects and edges between objects. For example, a conventional edge detection algorithm operating on data in frame buffer 350 may not be able to distinguish between an edge within an image object, and the edge between that image object and another adjacent image object.

Once edge information per color plane 345 has been extracted from frame buffer 350, data in frame buffer 350 may be subjected to trapping in step 360. Any of several well-known trapping algorithms may be used to perform trapping. Trapped frame buffer 355 may then be subjected to any additional processing in step 370. For example, print engine 177 may render trapped frame buffer 355 on a print medium after further processing.

Figure 4:
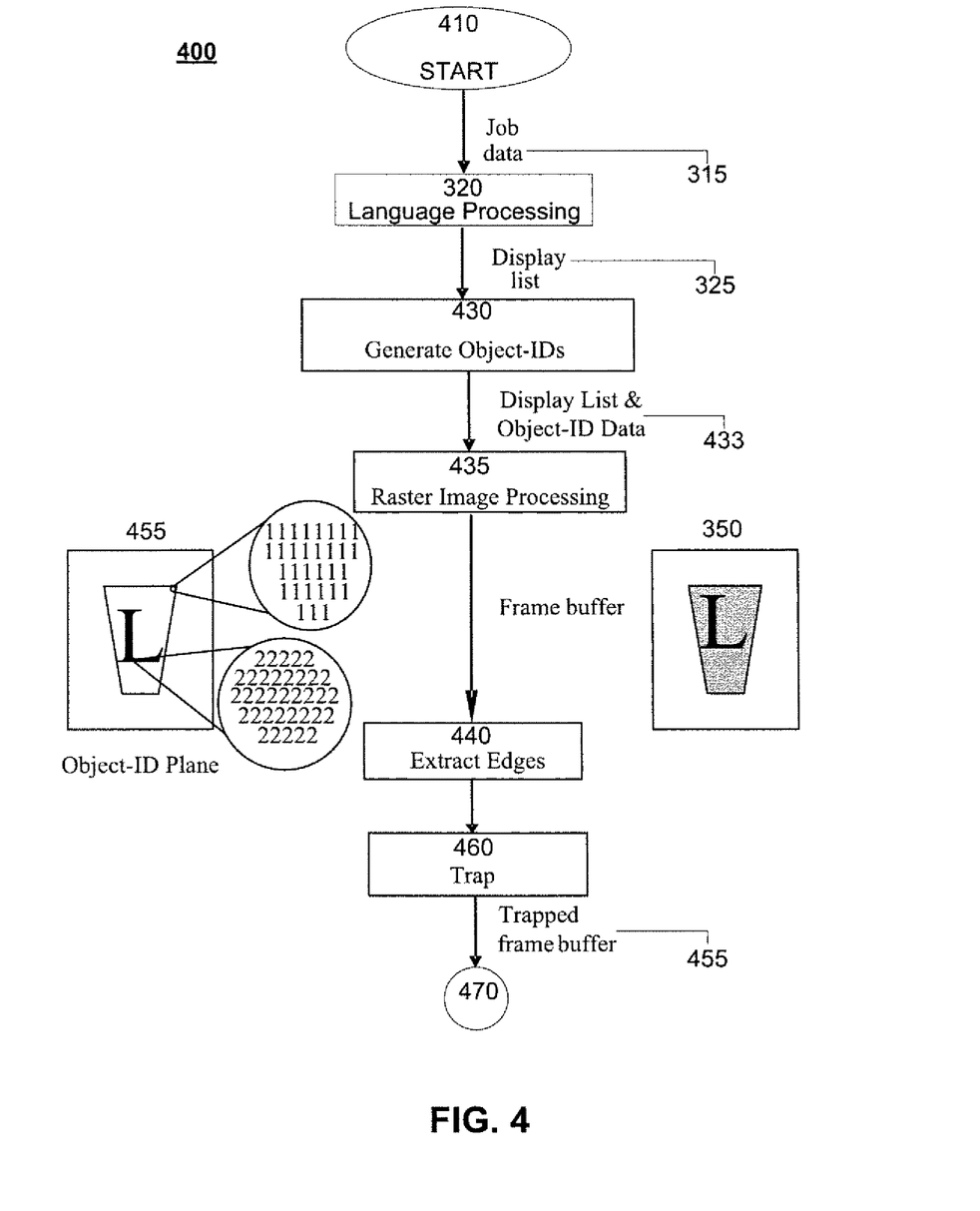
FIG. 4 illustrates the correspondence between exemplary objects in a frame buffer and data in the object-ID plane.

FIG. 4 shows exemplary flowchart 400 illustrating steps in a method for performing trapping on data according to some embodiments of the present invention. The algorithm may commence in step 410 with the initiation of a print job. As described earlier with respect to FIG. 3, in step 320, print job data 315 can be subjected to language processing. For example, language processing may be performed by a language server. The language server may take PDL language-level objects and transform these into data and graphical objects and add these to display list 325.

In step 430 of the exemplary flowchart, display list 325 may be further processed to generate object-ID data. A unique object-ID may be generated for each display list object. The object-ID can be used to distinguish among the various graphical objects that comprise a page. In some embodiments, object-ID plane 455 may be made available to store object-ID's. For example, object-ID plane may be implemented as one or more 2-dimensional arrays. In some embodiments, object-ID plane 455 may be configured with the same geometry as frame buffer 350. For example, object-ID plane 455 may be implemented as an additional plane of data logically separate from frame buffer 350 and each object may be assigned an associated object-ID, written into object ID plane 455 as described in more detail below. The object-ID may be a number, character, symbol, or any other equivalent mechanism of identifying display list objects. In general, object-ID's may be configured with a bit width that depends on the needs and capabilities of the system. For example, an object-ID may be 16 bits, which would allow identification of $2^{16}-1$ unique objects. In general, a greater bit-width permits the assignment of unique identifiers to a larger number of display list objects. Accordingly, bit-width may be chosen at design time based on the size of memory 172, or based on the number of likely distinct objects in the display list for a typical page for a given printer type or model. For example, 4-bit object-IDs may be sufficient for some printer models based on the typical or intended usage patterns of the devices.

In some embodiments, object-ID's may be implemented using a b-bit counter that is initialized to 1 at the beginning of the page and incremented each time processing begins on a new language-level object. Display list objects may be generated in accordance with various language directives in the print job; however, each display list object can be associated with the value of the b-bit counter at the time of its generation. In some embodiments, incrementing the counter beyond the range of b-bits sets it to 1. For example, if b=4 and the counter is at 15 (binary 1111), then incrementing by 1 sets the counter to 1 (binary 0001). If the number of language-level objects for the page is less than 15, then they will all have unique object-IDs. On the other hand, if the number of language-level objects exceeds 15, then some objects may have identical object-IDs.

In step 435, raster image processing may be performed on display list objects and object-ID data 433. Objects in display list 325 may be rendered into frame buffer 350 as described earlier with respect to FIG. 3. In some embodiments, at the time of rendering an object in display list 325 into frame buffer 350, the associated object-ID for the object may be written to the object ID plane 455 so as to cover the same geometry that the object covers in frame buffer 350. For example, when rendering an object, if a pixel at coordinate (x,y) is marked in frame buffer 350, then a corresponding pixel (x,y) in the object-ID plane is set to the object-ID value associated with the object.

FIG. 4 shows exemplary object-ID plane 455. Exemplary object-ID plane 455 may be generated for a print job that consists of two directives: (i) fill a given path with some color; and (ii) draw the letter "L" on the page. For the print job associated with the two directives described above, the object-ID for the display list object used to fill the path with the color may have the value 1, while the object-ID for the display list object used to draw the letter "L" may have the value 2. Thus, in the example above, after raster image processing step 435 the object ID plane would consist of the colored region described by the path, filled with the number 1, and the region covered by the lower-level instruction for letter "L", filled with the number 2. In some embodiments, the data in object-ID plane may be compressed. For example run-length compression could be used on scan-lines of data. In such cases, the object ID plane can be represented by an array consisting of lists of ordered pairs, where each list corresponds to a scan-line, and each ordered pair corresponds to an object that intersects that scan-line. The ordered pairs may be used represent intervals of pixels in the scan-line. In some embodiments, other compression techniques may be used to reduce the memory used by the object-ID plane. Appropriate memory management techniques may also be used to allocate, release, and manage memory when using compression techniques.

In step 440, edges may be extracted using data in object-ID plane 455. An edge-finding algorithm can then be used on object-ID plane 455 to find pixels suitable for trapping and/or edge-enhancement. Examples of such edge-finding algorithms include morphological techniques such as performing dilation on each object in object-ID plane 455 and then computing the set-wise difference between the dilated and original objects. Other edge-finding techniques may include convolving objects in object-ID plane 455 with a differencing kernel and then finding positive or negative values in the result. Because object-ID plane 455 preserves the association between an object and pixels corresponding to the object in frame buffer 350, data in object-ID plane 455 can be used to unambiguously identify the exact set of pixels that belong to each object on a page. If two adjacent pixels on a page have different object-IDs in object-ID plane 455, then they belong to different objects and thus are candidates for trapping.

In one embodiment, it may be advantageous to use a lower bit width (i.e. a lower number of bits) to assign object-IDs. In such situations, object-IDs may overlap if the number of objects on a page exceeds the number of unique objects capable of being described by the bit width. However, the edge-finding algorithms used in step 440 would continue to detect object boundaries so long as adjacent objects receive unique object-IDs. For example, before rendering each object into frame buffer 350, the region to be marked by the new object, or its computed boundary, may be inspected and a list of object-IDs already in use may be created. An object-ID not present on the list may be assigned to the new object. In some embodiments, edge-detection methods described in relation to FIG. 4 may be used in combination with one or more of the conventional edge-detection algorithms described in relation to FIG. 3.

In some embodiments, edge-finding may be performed on objects in display list 325 as they are rendered, rather than as a separate step later. Applying edge-finding to objects in display list 325 as they are rendered may be performed for objects whose boundaries may be easily computed, such as rectangular objects, and/or in situations where the overlap between objects is minimal or non-existent. In some embodiments, edge-finding may be performed on overlapping objects as they are rendered by changing the stored record of object boundaries in the object plane. The use of object-IDs and an object-ID plane is one mechanism to correlate object data with pixels in color-planes in the frame-buffer. Other approaches may be used depending on details of the context and environment in which the methods described are being applied. For example, if object boundaries are determined as the time they are rendered, candidate pixels for trapping may be identified, and only information pertaining to these pixels may need to be stored.

In step 460, standard trapping algorithms may be applied to pixels of color planes corresponding to candidates selected for trapping. Since frame buffer 350 may comprise of multiple color planes, pixels of the constituent color planes of the candidate may be modified. Some techniques for implementing trapping are described in the PostScript Language Reference Manual, $3^{rd}$ ed., 1999, Adobe Systems Inc., which is incorporated by reference in its entirety. See, in particular, §§6.3-6.4. Note that because the association of objects to pixels is preserved, the algorithm can prevent trapping of edges within objects. For example, edges within image objects will not be trapped, which typically leads to good quality output. In one embodiment, edge enhancement may be applied to text objects. In another embodiment, trapping may not be applied to text objects below a certain font size.

In some embodiments, a program for conducting the above process can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A computer-implemented method for performing trapping using object information present in printable data, the method comprising:
  generating, from the object information present in the printable data, a display list;
  generating, from the display list, object-ID data, wherein each object-ID identifies one or more display list objects;
  rasterizing the display list and storing resulting rasterized display list data in at least one of a plurality of color planes in a frame buffer;
  rasterizing the object-ID data and storing resulting rasterized object-ID data in an object-ID plane, wherein the object-ID plane is separate from the plurality of color planes, and wherein the object-ID plane comprises a two-dimensional array configured with the same geometry as the frame buffer;
  determining object boundaries for at least one object in the printable data based on stored data in the object-ID plane;
  selecting candidate objects for trapping using the object boundary data; and
  modifying pixels in the at least one color plane corresponding to candidate objects selected for trapping.

2. The method of claim 1, wherein object-ID information stored in the object-ID plane is held in a compressed format.

3. The method of claim 2, wherein the compression format used is run length encoding.

4. The method of claim 1, wherein the object-ID assigned to the object in the printable data uniquely identifies the object.

5. The method of claim 1, wherein the object-ID assigned to the at least one object overlaps with the object-IDs of non-adjacent objects.

6. The method of claim 1, wherein object boundaries are computed using one or more of:
  computing the set-wise difference between the dilated and original objects; and
  finding non-zero values in the result obtained by convolving objects in object-ID plane with a differencing kernel.

7. The method of claim 1, wherein the method is performed on one or more of:
  a computer; and
  a printing device.

8. A non-transitory computer-readable medium that stores instructions that when executed by a processor perform steps in a method for trapping using object information present in a printable data, the method comprising:
  generating, from the object information present in the printable data, a display list;
  generating, from the display list, object-ID data, wherein each object-ID identifies one or more display list objects;
  rasterizing the display list and storing resulting rasterized display list data in at least one of a plurality of color planes in a frame buffer;
  rasterizing the object-ID data and storing resulting rasterized object-ID data in an object-ID plane, wherein the object-ID plane is separate from the plurality of color planes, and wherein the object-1D plane comprises a two-dimensional array configured with the same geometry as the frame buffer;
  determining object boundaries for at least one object in the printable data based on stored data in the object-ID plane;
  selecting candidate objects for trapping using the object boundary data; and
  modifying pixels in the at least one color plane corresponding to candidate objects selected for trapping.

9. The computer-readable medium of claim 8, wherein determining boundaries for the at least one object using the printable data further comprises:
  storing the object-1D in an object-ID plane in accordance with a shape of the object; and
  computing object boundaries using stored data in the object-ID plane.

10. The computer-readable medium of claim 9, wherein the object-ID plane stores object-ID information correlating the object with corresponding pixels in the at least one color plane in the frame buffer.

11. The computer-readable medium of claim 9, wherein the object-ID information stored in the object-ID plane is held in a compressed format.

12. The computer-readable medium of claim 9, wherein object boundaries are computed using one or more of:
  computing the set-wise difference between the dilated and original objects; and
  finding non-zero values in the result obtained by convolving objects in object-ID plane with a differencing kernel.

13. A computer-readable memory containing instructions for causing a processor to perform steps in a method for trapping using object information present in a printable data, the method comprising:
  generating, from the object information present in the printable data, a display list;
  generating, from the display list, object-ID data, wherein each object-ID identifies one or more display list objects;
  rasterizing the display list and storing resulting rasterized display list data in at least one of a plurality of color planes in a frame buffer;
  rasterizing the object-ID data and storing resulting rasterized object-ID data in an object-ID plane, wherein the object-ID plane is separate from the plurality of color planes, and wherein the object-ID plane comprises a two-dimensional array configured with the same geometry as the frame buffer;
  determining object boundaries for the at least one object in the printable data based on stored data in the object-ID plane;
  selecting candidate objects for trapping using the object boundary data; and
  modifying pixels in the at least one color plane corresponding to candidate objects selected for trapping.

14. The computer-readable memory of claim 13, wherein determining boundaries for at least one object using the printable data further comprises:
  storing the at least one object-ID in an object-ID plane in accordance with a shape of the object; and
  computing object boundaries using stored data in the object-ID plane.

15. The computer-readable memory of claim 14, wherein the object-ID plane stores object-1D information correlating the object with corresponding pixels in the at least one color plane in the frame buffer.

16. The computer-readable memory of claim 13, wherein object boundaries are computed using one or more of:
  computing the set-wise difference between the dilated and original objects; and finding non-zero values in the result obtained by convolving objects in object-ID plane with a differencing kernel.

* * * * *